US011363592B2

(12) United States Patent
Suzuki et al.

(10) Patent No.: US 11,363,592 B2
(45) Date of Patent: Jun. 14, 2022

(54) TERMINAL APPARATUS AND COMMUNICATION METHOD FOR PERFORMING A PUSCH TRANSMISSION

(71) Applicants: Sharp Kabushiki Kaisha, Sakai (JP); FG Innovation Company Limited, New Territories (HK)

(72) Inventors: Shoichi Suzuki, Sakai (JP); Tomoki Yoshimura, Sakai (JP); Wataru Ouchi, Sakai (JP); Taewoo Lee, Sakai (JP); Liqing Liu, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 20 days.

(21) Appl. No.: 16/643,604

(22) PCT Filed: Sep. 6, 2018

(86) PCT No.: PCT/JP2018/033029
§ 371 (c)(1),
(2) Date: Mar. 2, 2020

(87) PCT Pub. No.: WO2019/049929
PCT Pub. Date: Mar. 14, 2019

(65) Prior Publication Data
US 2020/0351870 A1 Nov. 5, 2020

(30) Foreign Application Priority Data

Sep. 6, 2017 (JP) .............................. JP2017-170971

(51) Int. Cl.
*H04W 72/04* (2009.01)
*H04W 52/34* (2009.01)

(52) U.S. Cl.
CPC ....... *H04W 72/0446* (2013.01); *H04W 52/34* (2013.01)

(58) Field of Classification Search
CPC ............. H04W 72/0446; H04W 52/34; H04W 72/0473; H04W 52/04; H04W 52/54;
(Continued)

(56) References Cited

U.S. PATENT DOCUMENTS 8,379,581 B2 * 2/2013 Imamura ............. H04W 52/367
370/329
8,811,222 B2 * 8/2014 Pajukoski .............. H04B 17/24
370/252

(Continued)

FOREIGN PATENT DOCUMENTS

| EP | 2849517 A1 | 3/2015 |
| EP | 3032895 A1 | 6/2016 |
| EP | 3057245 A1 | 8/2016 |

OTHER PUBLICATIONS

Official Communication issued in International Patent Application No. PCT/JP2018/033029, dated Nov. 13, 2018.

(Continued)

*Primary Examiner* — Hoang-Chuong Q Vu
(74) *Attorney, Agent, or Firm* — ScienBiziP, P.C.

(57) ABSTRACT

A terminal apparatus determines the parameter $f_c(i)$, based on at least whether an RRC layer parameter symPUSCH_UpPTS is configured for the terminal apparatus, calculates transmit power for PUSCH transmission in a subframe i, based on at least the parameter $f_c(i)$, maps a PUSCH to a SC-FDMA symbol of a special subframe, based on the RRC layer parameter symPUSCH_UpPTS, and transmits the PUSCH.

4 Claims, 14 Drawing Sheets

(58) Field of Classification Search
CPC ... H04W 52/58; H04W 52/545; H04W 52/36; H04W 52/365; H04W 52/146; H04W 28/06; H04W 52/30
See application file for complete search history.

(56) References Cited

U.S. PATENT DOCUMENTS

| | | | | |
|---|---|---|---|---|
| 8,812,040 | B2* | 8/2014 | Liu | H04W 52/146 455/509 |
| 2013/0272233 | A1* | 10/2013 | Dinan | H04L 5/001 370/329 |
| 2014/0254412 | A1* | 9/2014 | Siomina | H04W 4/02 370/252 |
| 2015/0085787 | A1 | 3/2015 | Ouchi | |
| 2016/0192369 | A1 | 6/2016 | Suzuki et al. | |
| 2016/0227491 | A1* | 8/2016 | Park | H04L 5/1438 |
| 2016/0254892 | A1 | 9/2016 | Kim et al. | |
| 2017/0041122 | A1* | 2/2017 | Li | H04L 5/001 |
| 2017/0272214 | A1* | 9/2017 | Chen | H04L 5/0001 |
| 2018/0083745 | A1* | 3/2018 | Sun | H04L 5/005 |
| 2018/0132197 | A1* | 5/2018 | Lin | H04W 52/42 |
| 2019/0327066 | A1* | 10/2019 | Gao | H04L 1/1854 |
| 2019/0373585 | A1* | 12/2019 | Suzuki | H04L 1/1893 |
| 2020/0178296 | A1* | 6/2020 | Shin | H04L 5/1469 |
| 2020/0304265 | A1 | 9/2020 | Kim et al. | |

OTHER PUBLICATIONS

China Mobile, "Motivation for New Work Item Proposal: UL transmission Enhancement for LTE", 3GPP TSG RAN Meeting #71, RP-160226, Mar. 7-10, 2016, 8 pages.

"3rd Generation Partnership Project; Technical Specification Group Radio Access Network; Evolved Universal Terrestrial Radio Access (E-UTRA); Physical channels and modulation (Release 14)", 3GPP TS 36.211 V14.3.0, Jun. 2017, pp. 1-196.

"3rd Generation Partnership Project; Technical Specification Group Radio Access Network; Evolved Universal Terrestrial Radio Access (E-UTRA); Physical layer procedures (Release 14)", 3GPP TS 36.213 V14.3.0, Jun. 2017, pp. 1-460.

Qualcomm et al., "Correction on PUSCH symbol locations in UpPTS for UL capacity enhancement in TS 36.211", 3GPP TSG-RAN WG1 Meeting #88bis, R1-1706772, Apr. 3-7, 2017, 5 pages.

Huawei et al., "Discussion on mapping of PUSCH in UpPTS", 3GPP TSG RAN WG1 Meeting #88bis, R1-1705123, Apr. 3-7, 2017, 2 pages.

"3rd Generation Partnership Project; Technical Specification Group Radio Access Network; Evolved Universal Terrestrial Radio Access (E-UTRA); Physical layer procedures (Release 13)", 3GPP TS 36.213 V13.6.0, Jun. 2017, pp. 1-390.

3GPP TS 36.213 V14.4.0 (Sep. 2017) 3rd Generation Partnership Project; Technical Specification Group Radio Access Network; Evolved Universal Terrestrial Radio Access (E-UTRA); Physical layer procedures (Release 14).

* cited by examiner

| UPLINK CYCLIC PREFIX CONFIGURATION (*UL-CyclicPrefixLength*) | CYCLIC PREFIX LENGTH $N_{CP,l}$ | SC-FDMA SYMBOL LENGTH |
|---|---|---|
| NORMAL CYCLIC PREFIX | 160 for $l = 0$<br>144 for $l = 1, 2, \cdots, 6$ | $(160+2048) \cdot T_s$ for $l = 0$<br>$(144+2048) \cdot T_s$ for $l = 1, 2, \cdots, 6$ |

FIG. 4

| UL/DL CONFIGURATION | DOWNLINK-TO-UPLINK SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 2 | 5 ms | D | S | U | D | D | D | S | U | D | D |

FIG. 5

| SPECIAL SUBFRAME CONFIGURATION | DwPTS | UpPTS |
|---|---|---|
| 10 | $13168 \cdot T_s$ (6 symbol) | $13152 \cdot T_s$ (6 symbol) |

FIG. 6

TERMINAL APPARATUS AND COMMUNICATION METHOD FOR PERFORMING A PUSCH TRANSMISSION

TECHNICAL FIELD

The present invention relates to a terminal apparatus and a communication method.

This application claims priority based on JP 2017-170971 filed on Sep. 6, 2017, the contents of which are incorporated herein by reference.

BACKGROUND ART

A radio access method and a radio network for cellular mobile communications (hereinafter, referred to as "Long Term Evolution (LTE, trade name)", or "Evolved Universal Terrestrial Radio Access (EUTRA)") have been studied in the 3rd Generation Partnership Project (3GPP). In LTE, a base station apparatus is also referred to as an evolved NodeB (eNodeB), and a terminal apparatus is also referred to as a User Equipment (UE). LTE is a cellular communication system in which multiple areas are deployed in a cellular structure, with each of the multiple areas being covered by a base station apparatus. A single base station apparatus may manage multiple cells.

LTE supports a Time Division Duplex (TDD). LTE that employs the TDD scheme is also referred to as TD-LTE or LTE TDD. In TDD, uplink signals and downlink signals are time division multiplexed. Furthermore, LTE supports a Frequency Division Duplex (FDD).

In the 3GPP, a study has been underway to transmit a PUSCH in an UpPTS of a special subframe in order to enhance uplink capacity (NPL 1). NPL 2 and NPL 3 describe a method for transmitting a PUSCH in an UpPTS of a special subframe.

CITATION LIST

Non Patent Literature

NPL 1: "Motivation for New Work Item Proposal: UL transmission Enhancement for LTE", R1-160226, CMCC, 3GPP TSG RAN Meeting #71, Gothenburg, Sweden, 7-10 Mar. 2016.
NPL 2: "3GPP TS 36.211 V14.3.0 (2017-06)", 23 Jun. 2017.
NPL 3: "3GPP TS 36.213 V14.3.0 (2017-06)", 23 Jun. 2017.

SUMMARY OF INVENTION

Technical Problem

A aspect of the present invention provides a terminal apparatus capable of efficiently communicating with a base station apparatus by use of uplink signals, a base station apparatus communicating with the terminal apparatus, a communication method used for the terminal apparatus, a communication method used for the base station apparatus, an integrated circuit mounted on the terminal apparatus, and an integrated circuit mounted on the base station apparatus.

Solution to Problem (1) According to some aspects of the present invention, the following measures are provided. A first aspect of the present invention is a terminal apparatus including a transmitter configured to map a PUSCH to a SC-FDMA symbol of a special subframe, based on an RRC layer parameter symPUSCH_UpPTS to transmit the PUSCH; and a transmit power control unit configured to determine the parameter $f_c(i)$, based on at least whether the RRC layer parameter symPUSCH_UpPTS is configured for the terminal apparatus, and calculate transmit power for PUSCH transmission in a subframe i, based on at least the parameter $f_c(i)$.

(2) A second aspect of the present invention is a communication method for a terminal apparatus, the communication method including the steps of: mapping a PUSCH to a SC-FDMA symbol of a special subframe, based on an RRC layer parameter symPUSCH_UpPTS; transmitting the PUSCH; determining the parameter $f_c(i)$, based on at least whether the RRC layer parameter symPUSCH_UpPTS is configured for the terminal apparatus; and calculating transmit power for PUSCH transmission in a subframe i, based on at least the parameter $f_c(i)$.

Advantageous Effects of Invention

According to an aspect of the present invention, a terminal apparatus and a base station apparatus can efficiently communicate with each other by use of uplink signals.

BRIEF DESCRIPTION OF DRAWINGS

FIG. 4 is a diagram illustrating an example of a configuration of an uplink cyclic prefix according to the present embodiment.

FIG. 5 is a diagram illustrating UL/DL configuration 2 according to the present embodiment.

FIG. 6 is a diagram illustrating an example of special subframe configuration 10 for normal CP in a downlink according to the present embodiment.

DESCRIPTION OF EMBODIMENTS

Embodiments of the present invention will be described below.

Figure 1:
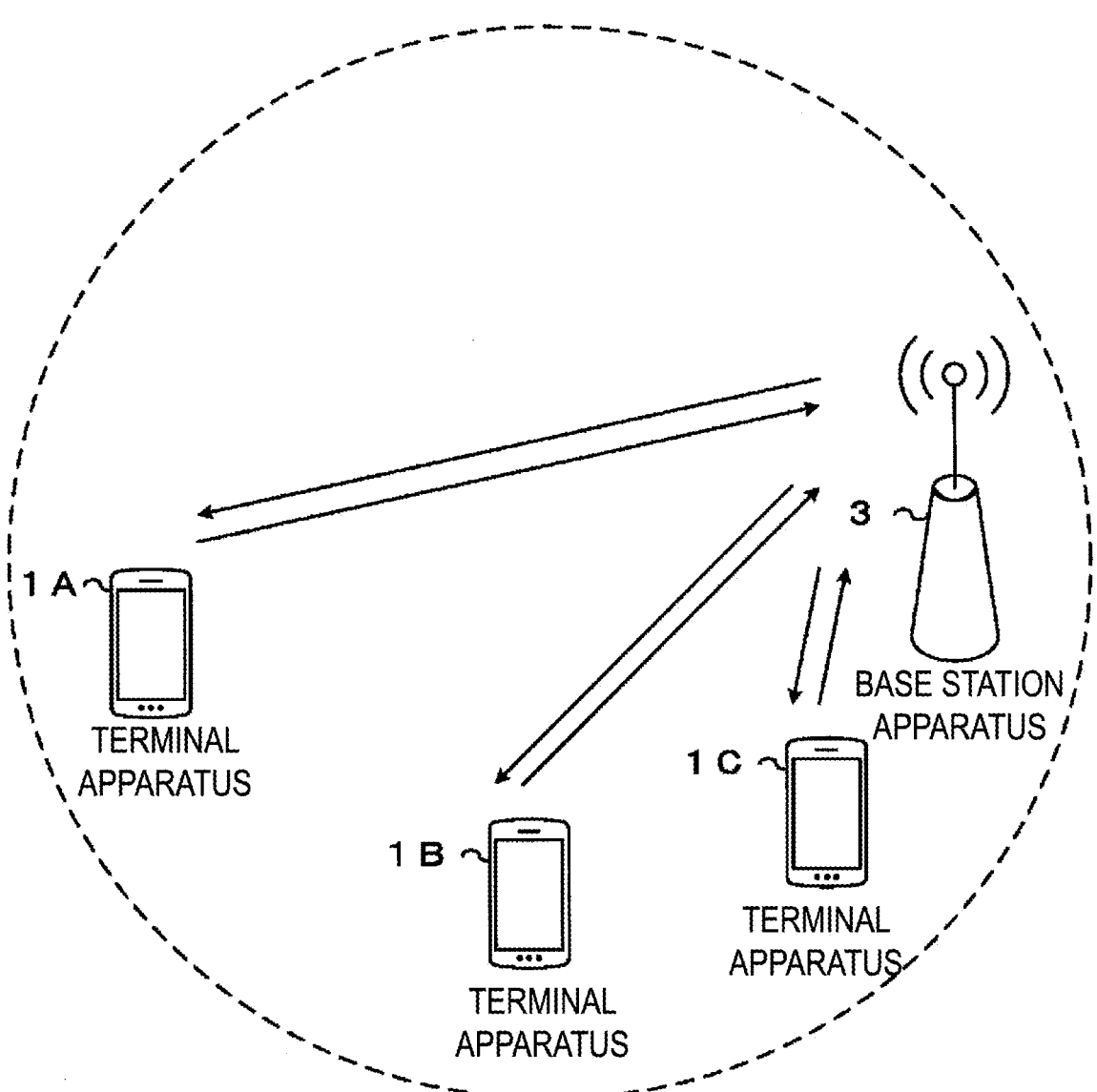
FIG. 1 is a conceptual diagram of a radio communication system according to the present embodiment.

FIG. 1 is a conceptual diagram of a radio communication system according to the present embodiment. In FIG. 1, a radio communication system includes terminal apparatuses 1A to 1C and a base station apparatus 3. The terminal apparatuses 1A to 1C are each referred to as a terminal apparatus 1.

Carrier aggregation will be described below.

Multiple serving cells may be configured for the terminal apparatus 1. A technology in which the terminal apparatus 1 communicates via multiple serving cells is referred to as cell aggregation or carrier aggregation. One aspect of the present invention may be applied to each of the multiple serving cells configured for the terminal apparatus 1. In carrier aggregation, the multiple configured serving cells are also referred to as aggregated serving cells.

Time Division Duplex (TDD) and/or Frequency Division Duplex (FDD) is applied to a radio communication system in the present embodiment. In a case of cell aggregation, the TDD may be applied to all of the multiple serving cells. In the case of cell aggregation, serving cells to which the TDD is applied and serving cells to which the FDD is applied may be aggregated. In the present embodiment, the serving cell to which the TDD is applied is also referred to as a TDD serving cell, or a serving cell using frame structure type 2.

Each of the multiple configured serving cells includes one primary cell and one or more secondary cells. The primary cell is a serving cell in which an initial connection establishment procedure has been performed, a serving cell in which a connection re-establishment procedure has been initiated, or a cell indicated as a primary cell during a handover procedure. The secondary cell may be configured at a point of time when or after a Radio Resource Control (RRC) connection is established.

A carrier corresponding to a serving cell in the downlink is referred to as a downlink component carrier. A carrier corresponding to a serving cell in the uplink is referred to as an uplink component carrier. The downlink component carrier and the uplink component carrier are collectively referred to as a component carrier. In the TDD, the carrier corresponding to the serving cell in the uplink and the carrier corresponding to the serving cell in the downlink are the same.

The terminal apparatus 1 can simultaneously transmit multiple physical channels/multiple physical signals in the multiple TDD serving cells (component carriers) aggregated in the same band. The terminal apparatus 1 can simultaneously receive multiple physical channels/multiple physical signals in the multiple TDD serving cells (component carriers) aggregated in the same band.

In the present embodiment, a case that one serving cell is configured for the terminal apparatus 1 is described below.

Physical channels and physical signals according to the present embodiment will be described.

Figure 3:
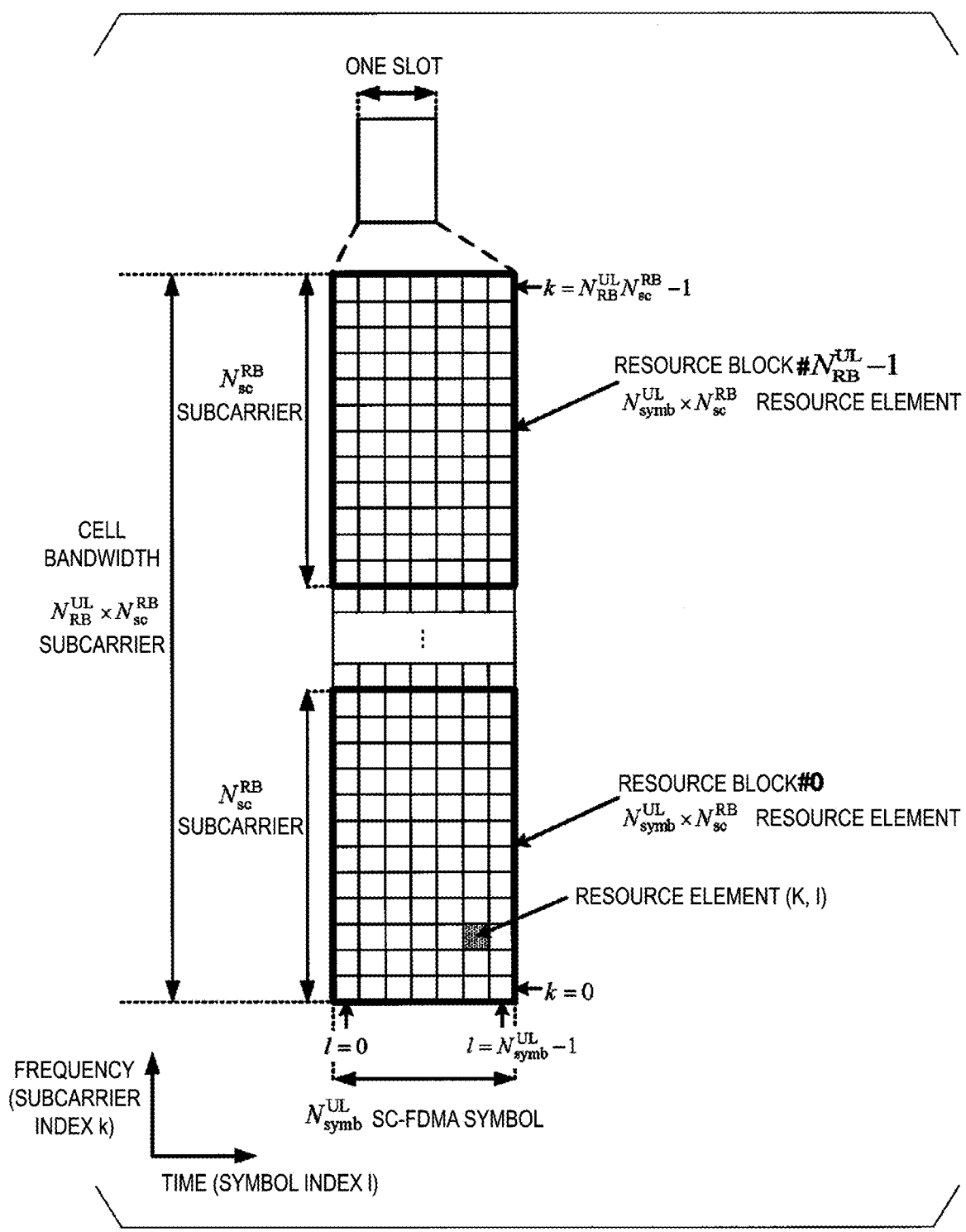
FIG. 3 is a diagram illustrating a schematic configuration of an uplink slot according to the present embodiment.

In FIG. 3, the following uplink physical channels are used for uplink radio communication from the terminal apparatus 1 to the base station apparatus 3. The uplink physical channels are used for transmitting information output from a higher layer.

Physical Uplink Control Channel (PUCCH)
Physical Uplink Shared Channel (PUSCH)
Physical Random Access Channel (PRACH)

The PUCCH is used to transmit Uplink Control Information (UCI). The uplink control information includes downlink Channel State Information (CSI), a Scheduling Request (SR) used to request a PUSCH (UpLink-Shared Channel (UL-SCH)) resource for initial transmission, and a Hybrid Automatic Repeat request ACKnowledgement (HARQ-ACK) for downlink data (a Transport block, a Medium Access Control Protocol Data Unit (MAC PDU), a Down-Link-Shared Channel (DL-SCH), or a Physical Downlink Shared Channel (PDSCH)).

The PUSCH is used for transmission of uplink data (Uplink-Shared Channel (UL-SCH)). Furthermore, the PUSCH may be used to transmit the HARQ-ACK and/or channel state information along with the uplink data. Furthermore, the PUSCH may be used to transmit only the channel state information or to transmit only the HARQ-ACK and the channel state information.

PRACH is used to transmit a random access preamble.

In FIG. 3, the following uplink physical signal is used for the uplink radio communication. The uplink physical signal is not used for transmitting information output from the higher layer, but is used by the physical layer.

Uplink Reference Signal (UL RS)

According to the present embodiment, the following two types of uplink reference signals are used.

Demodulation Reference Signal (DMRS)
Sounding Reference Signal/Sounding Reference Symbol (SRS)

The DMRS is associated with transmission of the PUSCH or the PUCCH. The DMRS is time-multiplexed with the PUSCH or the PUCCH. The base station apparatus 3 uses the DMRS in order to perform channel compensation of the PUSCH or the PUCCH. Transmission of both of the PUSCH and the DMRS is hereinafter referred to simply as transmission of the PUSCH. Transmission of both of the PUCCH and the DMRS is hereinafter referred to simply as transmission of the PUCCH.

The SRS is not associated with the transmission of the PUSCH or the PUCCH. The base station apparatus 3 may use the SRS to measure the channel state. The SRS is transmitted in the last Single Carrier-Frequency Division Multiple Access (SC-FDMA) of an uplink subframe, or in a SC-FDMA symbol in an UpPTS.

SRS Transmission is triggered by a higher layer signal and/or a DCI format. A trigger by the higher layer signal is also referred to as trigger type 0. A trigger by the DCI format is also referred to as trigger type 1.

In FIG. 3, the following downlink physical channels are used for downlink radio communication from the base station apparatus 3 to the terminal apparatus 1. The downlink physical channels are used for transmitting information output from the higher layer.

Physical Broadcast Channel (PBCH)
Physical Control Format Indicator Channel (PCFICH)
Physical Hybrid automatic repeat request Indicator Channel (PHICH)
Physical Downlink Control Channel (PDCCH)
Enhanced Physical Downlink Control Channel (EPDCCH)
Physical Downlink Shared Channel (PDSCH)
Physical Multicast Channel (PMCH)

The PBCH is used for broadcasting a Master Information Block (MIB, a Broadcast Channel (BCH)) that is shared by the terminal apparatuses 1.

The PCFICH is used for transmission of information for indicating a region (OFDM symbols) to be used for transmission of the PDCCH.

The PHICH is used for transmission of an HARQ indicator (HARQ feedback or response information) for indicating an ACKnowledgement (ACK) or a Negative ACKnowledgement (NACK) for the uplink data (Uplink Shared Channel (UL-SCH)) received by the base station apparatus 3.

The PDCCH and the EPDCCH are used to transmit Downlink Control Information (DCI). The downlink control information is also referred to as DCI format. The downlink control information includes a downlink grant and an uplink grant. The downlink grant is also referred to as a downlink assignment or a downlink allocation.

The downlink grant is used for scheduling of a single PDSCH within a single cell. The downlink grant is used for the scheduling of the PDSCH within the same subframe as the subframe on which the downlink grant is transmitted.

The uplink grant is used for scheduling of a single PUSCH within a single cell. The uplink grant is used for scheduling of a single PUSCH within the fourth or later subframe from the subframe in which the uplink grant is transmitted. The uplink grant transmitted on the PDCCH is also referred to as DCI format 0.

The CRC parity bits added to the downlink grant or the uplink grant are scrambled with a Cell-Radio Network Temporary Identifier (C-RNTI), a Temporary C-RNTI, or a Semi Persistent Scheduling Cell-Radio Network Temporary Identifier (SPS C-RNTI). The C-RNTI and the SPS C-RNTI are identifiers for identifying a terminal apparatus within a cell. The Temporary C-RNTI serves as an identifier used for identifying the terminal apparatus 1 that has transmitted a random access preamble in a contention based random access procedure.

The C-RNTI and the Temporary C-RNTI are used to control the PDSCH or PUSCH in a single subframe. The SPS C-RNTI is used to periodically allocate a resource for the PDSCH or the PUSCH.

The PDSCH is used to transmit downlink data (Downlink Shared Channel (DL-SCH)).

The PMCH is used to transmit multicast data (Multicast Channel (MCH)).

In FIG. 3, the following downlink physical signals are used for the downlink radio communication. The downlink physical signals are not used for transmission of information output from the higher layer, but are used by the physical layer.

Synchronization signal (SS)

Downlink Reference Signal (DL RS)

The synchronization signal is used for the terminal apparatus 1 to establish synchronization in a frequency domain and a time domain in the downlink. In the TDD scheme, the synchronization signal is mapped to subframes 0, 1, 5, and 6 within a radio frame. In the FDD scheme, the synchronization signal is mapped to subframes 0 and 5 within a radio frame.

The downlink reference signal is used for the terminal apparatus 1 to perform channel compensation on a downlink physical channel. The downlink reference signal is used for the terminal apparatus 1 to obtain the downlink channel state information.

The downlink physical channels and the downlink physical signals are collectively referred to as a downlink signal. The uplink physical channels and the uplink physical signals are collectively referred to as an uplink signal. The downlink physical channels and the uplink physical channels are collectively referred to as a physical channel. The downlink physical signals and the uplink physical signals are collectively referred to as a physical signal.

The BCH, the MCH, the UL-SCH, and the DL-SCH are transport channels. A channel used in a Medium Access Control (MAC) layer is referred to as a transport channel. A unit of the transport channel used in the MAC layer is also referred to as a transport block (TB) or a MAC Protocol Data Unit (PDU). A Hybrid Automatic Repeat reQuest (HARQ) is controlled for each transport block in the MAC layer. The transport block is a unit of data that the MAC layer delivers to the physical layer. In the physical layer, the transport block is mapped to a codeword, and coding processing is performed for each codeword.

The base station apparatus 3 and the terminal apparatus 1 exchange (transmit and/or receive) a signal in the higher layer. For example, the base station apparatus 3 and the terminal apparatus 1 may transmit and/or receive Radio Resource Control (RRC) signaling (also referred to as a Radio Resource Control (RRC) message or Radio Resource Control (RRC) information) in a Radio Resource Control (RRC) layer. Furthermore, the base station apparatus 3 and the terminal apparatus 1 may transmit and/or receive, in the Medium Access Control (MAC) layer, a MAC Control Element (CE). Here, the RRC signaling and/or the MAC CE is also referred to as higher layer signaling. The PUSCH and the PDSCH are used to transmit the RRC signaling and the MAC CE.

Figure 2:
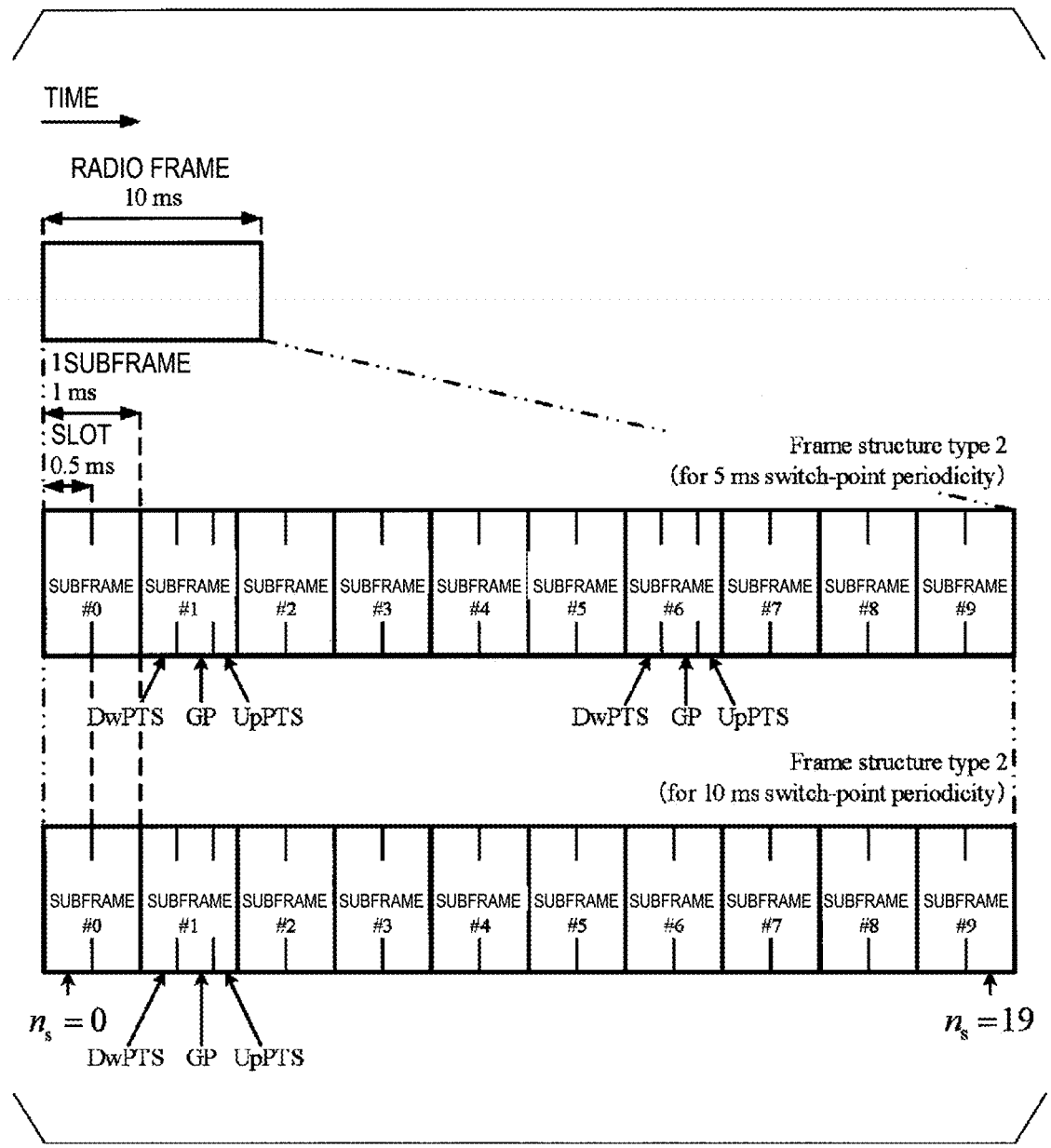
FIG. 2 is a diagram illustrating a schematic configuration of a radio frame of frame structure type 2 according to the present embodiment.

FIG. 2 is a diagram illustrating a schematic configuration of a radio frame of frame structure type 2 according to the present embodiment. Frame structure type 2 is applicable to the TDD. In FIG. 2, the horizontal axis is a time axis.

Sizes of the various fields in the time domain is expressed by numerals of time units $T_s=1/(15000 \cdot 2048)$ seconds. A length of the radio frame of frame structure type 2 is $T_f=307200 \cdot T_s=10$ ms. The radio frame of frame structure type 2 includes two half-frames contiguous in the time domain. A length of each half-frame is $T_{half-frame}=153600 \cdot T_s=5$ ms. Each half-frame includes five subframes contiguous in the time domain. A length of each subframe is $T_{subframe}=30720 \cdot T_s=1$ ms. Each subframe i includes two slots contiguous in the time domain. The two slots contiguous in the time domain are a slot having a slot number $n_s$ of 2i in the radio frame and a slot having a slot number $n_s$ of 2i+1 in the radio frame. A length of each slot is $T_{slot}=153600 \cdot n_s=0.5$ ms. Each radio frame includes ten subframes contiguous in the time domain. Each radio frame includes 20 slots ($n_s=0, 1, \ldots, 19$) contiguous in the time domain.

A configuration of a slot according to the present embodiment will be described below. FIG. 3 is a diagram illustrating a schematic configuration of an uplink slot according to the present embodiment. FIG. 3 illustrates a configuration of an uplink slot in one cell. In FIG. 3, the horizontal axis is a time axis, and the vertical axis is a frequency axis. In FIG. 3, 1 represents an SC-FDMA symbol number/index, and k represents a subcarrier number/index.

The physical signal or the physical channel transmitted in each of the slots is expressed by a resource grid. In uplink, the resource grid is defined by multiple subcarriers and multiple SC-FDMA symbols. Each element within the resource grid is referred to as a resource element. The resource element is expressed by the subcarrier number/index k and the SC-FDMA symbol number/index 1.

The resource grid is defined for each antenna port. In the present embodiment, description is given for one antenna port. The present embodiment may be applied to each of multiple antenna ports.

The uplink slot includes multiple SC-FDMA symbols 1 ($1=0, 1, \ldots, N^{UL}_{symb}$) in the time domain. $N^{UL}_{symb}$ represents the number of SC-FDMA symbols included in one uplink slot. For a normal Cyclic Prefix (CP) in the uplink, $N^{UL}_{symb}$ is 7. For an extended CP in the uplink, $N^{UL}_{symb}$ is 6.

The terminal apparatus 1 receives a parameter UL-CyclicPrefixLength indicating the CP length in the uplink from the base station apparatus 3. The base station apparatus 3 may broadcast, in the cell, system information including the parameter UL-CyclicPrefixLength corresponding to the cell.

FIG. 4 is a diagram illustrating an example of a configuration of an uplink cyclic prefix according to the present embodiment. $N_{CP,l}$ represents the uplink CP length for the SC-FDMA symbol 1 in the slot. In a case that the uplink cyclic prefix configuration (UL-CyclicPrefixLength) is a normal CP, $N_{CP,0}=160$ for l=0. The length of the SC-FDMA symbol 1 excluding the CP length is $2048 \cdot T_s$, and the length of the SC-FDMA symbol 1 including the CP length is $(N_{CP,1}+2048) \cdot T_s$.

The uplink slot includes multiple subcarriers k (k=0, 1, ..., $N^{UL}_{RB} * N^{RB}_{SC}$) in the frequency domain. $N^{UL}_{RB}$ is an uplink bandwidth configuration for the serving cell expressed by a multiple of $N^{RB}_{SC}$. $N^{RB}_{SC}$ is a (physical) resource block size in the frequency domain expressed by the number of subcarriers. In the present embodiment, a subcarrier spacing Δf is 15 kHz, and $N^{RB}_{sc}$ is 12. In other words, in the present embodiment, $N^{RB}_{sc}$ is 180 kHz.

A resource block is used to express mapping of a physical channel to the resource elements. As the resource block, a virtual resource block and a physical resource block are defined. The physical channel is first mapped to a virtual resource block. Thereafter, the virtual resource block is mapped to a physical resource block. One physical resource block is defined by $N^{UL}_{symb}$ SC-FDMA symbols contiguous in the time domain and $N^{RB}_{sc}$ subcarriers contiguous in the frequency domain. Therefore, one physical resource block is constituted by $(N^{UL}_{symb} * N^{RB}_{SC})$ resource elements. One physical resource block may correspond to one slot in the time domain. The physical resource blocks may be numbered (0, 1, ..., $N^{UL}_{RB}-1$) in ascending order of frequencies in the frequency domain.

The downlink slot according to the present embodiment includes multiple OFDM symbols. Since a configuration of the downlink slot according to the present embodiment is basically the same except that the resource grid is constituted by multiple subcarriers and multiple OFDM symbols, a description of the configuration of the downlink slot will be omitted.

In a TDD serving cell, a value of the uplink bandwidth configuration for the TDD serving cell is the same as a value of the downlink bandwidth configuration for the TDD serving cell.

A resource block is used to represent mapping of a certain physical channel (such as the PDSCH or the PUSCH) to resource elements. As the resource block, a virtual resource block and a physical resource block are defined. A certain physical channel is first mapped to a virtual resource block. Thereafter, the virtual resource block is mapped to a physical resource block. One physical resource block is defined by seven consecutive OFDM symbols or SC-FDMA symbols in the time domain and by 12 consecutive subcarriers in the frequency domain. Hence, one physical resource block includes (7×12) resource elements. Furthermore, one physical resource block corresponds to one slot in the time domain and corresponds to 180 kHz in the frequency domain. Physical resource blocks are numbered from 0 in the frequency domain.

A time-continuous signal $s_l(t)$ in the SC-FDMA symbol 1 in the uplink slot is given by Equation (1). Equation (1) is applied to the uplink physical channel, excluding the uplink physical signal and the PRACH.

$$s_l(t) = \sum_{k=-\lfloor N^{UL}_{RB}N^{RB}_{sc}/2 \rfloor}^{\lceil N^{UL}_{RB}N^{RB}_{sc}/2 \rceil - 1} a_{k^{(-)},l} \cdot e^{j2\pi(k+1/2)\Delta f(t-N_{CP,l}T_s)} \quad \text{Equation 1}$$

for $0 \le t < (N_{CP,l} + 2048) \times T_s$ where $k^{(-)} = k + \lfloor N^{UL}_{RB}N^{RB}_{sc}/2 \rfloor$ and $\Delta f = 15$ kHz Here, $a_{k,l}$ is a content of a resource element (k, 1). The SC-FDMA symbol in the slot starts from l=0 and is transmitted in ascending order of 1. The SC-FDMA symbol l>0 starts at a time defined by Expression (2) in the slot.

$$\Sigma_{l'=0}^{l-1}(N_{CP,l'}+N)T_s \quad \text{Expression 2}$$

Hereinafter, an uplink/downlink configuration (UL/DL configuration) according to the present embodiment will be described.

Following three types of subframes are defined for frame structure type 2.

Downlink subframe
Uplink subframe
Special subframe

The downlink subframe is a subframe reserved for the downlink transmission. The uplink subframe is a subframe reserved for the uplink transmission. The special subframe includes three fields. The three fields are a Downlink Pilot Time Slot (DwPTS), a Guard Period (GP), and an Uplink Pilot Time Slot (UpPTS). The sum of lengths of the DwPTS, the GP, and the UpPTS is 1 ms. The DwPTS is a field reserved for the downlink transmission. The UpPTS is a field reserved for the uplink transmission. The GP is a field in which neither the downlink transmission nor the uplink transmission is performed. Moreover, the special subframe may include only the DwPTS and the GP, or may include only the GP and the UpPTS.

A radio frame of frame structure type 2 includes at least the downlink subframe, the uplink subframe, and the special subframe. A configuration of the radio frame of frame structure type 2 is indicated by the UL/DL configuration. The terminal apparatus 1 receives information indicating the UL/DL configuration from the base station apparatus 3. The base station apparatus 3 may broadcast, in the cell, system information including information indicating the UL/DL configuration corresponding to the cell.

FIG. 5 is a diagram illustrating UL/DL configuration 2 according to the present embodiment. FIG. 5 illustrates UL/DL configuration 2 in one radio frame. In FIG. 5, D denotes a downlink subframe, U denotes an uplink subframe, and S denotes a special subframe.

FIG. 6 is a diagram illustrating an example of special subframe configuration 10 for the normal CP in the downlink according to the present embodiment. In a case that the special subframe configuration for the normal CP in the downlink is 10, a length of the DwPTS is $13168 \cdot T_s$, and the DwPTS includes six OFDM symbols including the normal CP. In a case that the special subframe configuration for the normal CP in the downlink is 10 and an uplink cyclic prefix configuration (uplink CP configuration) is the normal CP, the length of the UpPTS is $13152 \cdot T_s$, and the UpPTS includes six SC-FDMA symbols including the normal CP.

Figure 7:
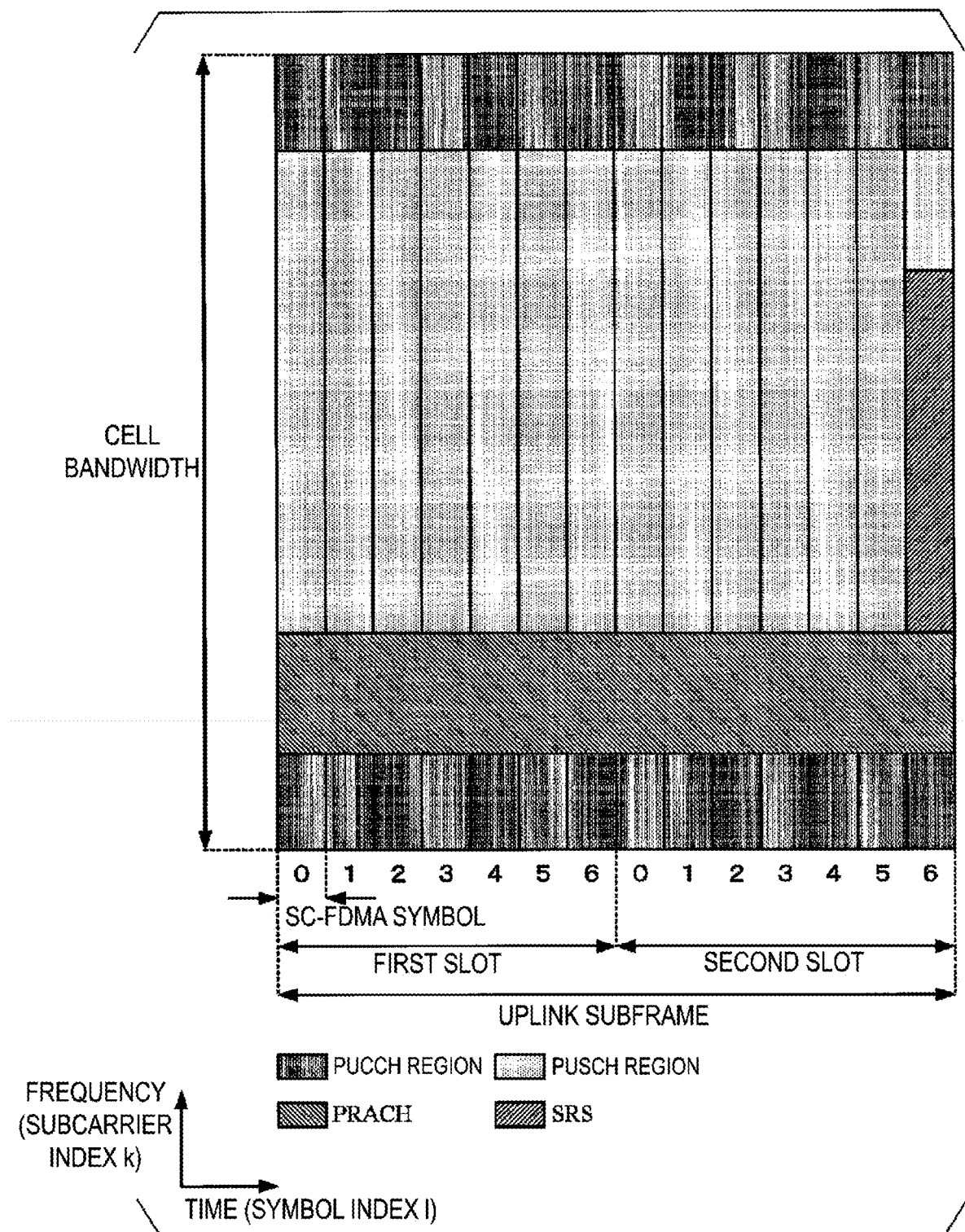
FIG. 7 is a diagram illustrating an example of an uplink subframe according to the present embodiment.
Figure 8:
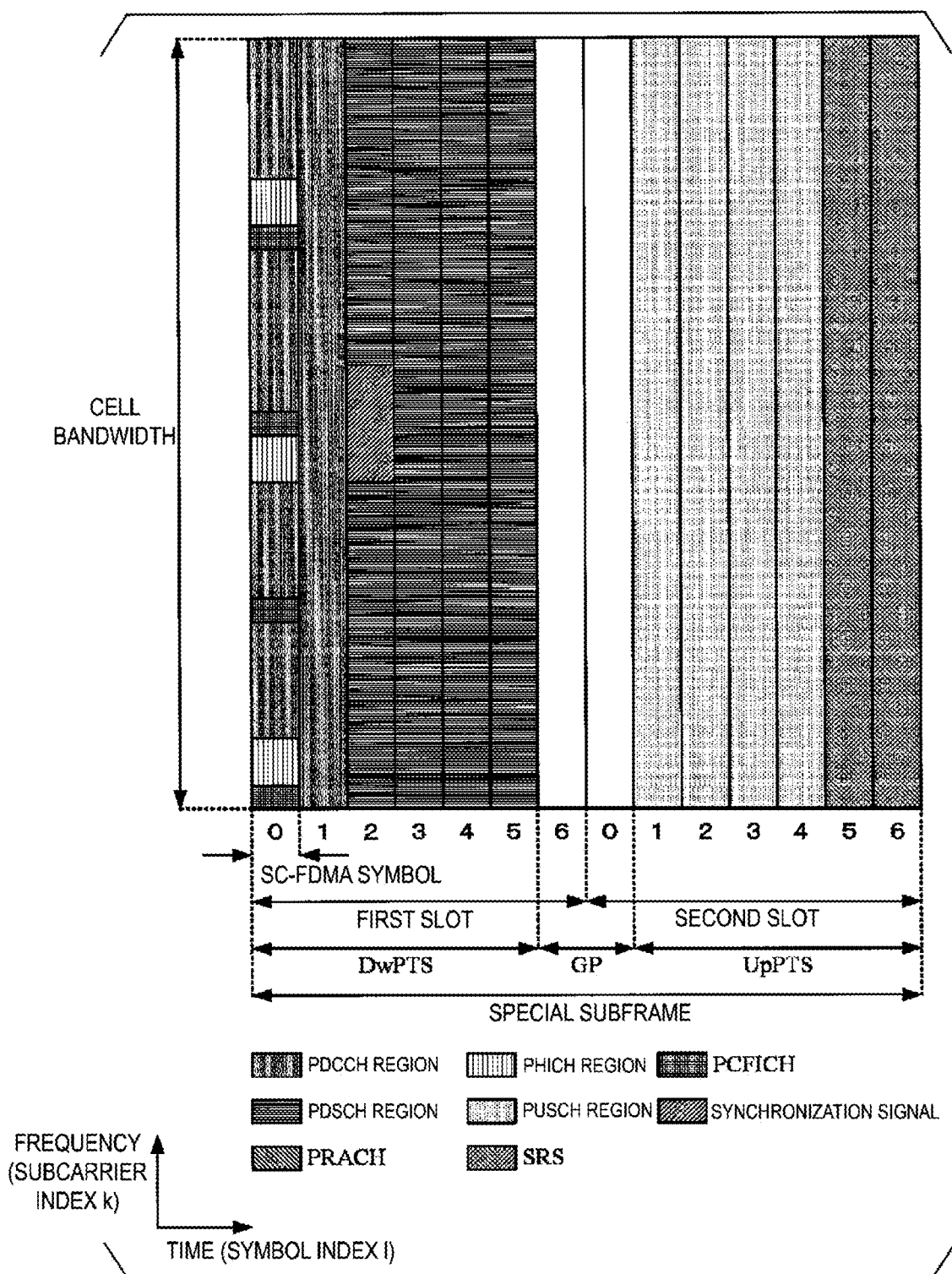
FIG. 8 is a diagram illustrating an example of a special subframe according to the present embodiment.

FIG. 7 is a diagram illustrating an example of the uplink subframe according to the present embodiment. FIG. 8 is a diagram illustrating an example of the special subframe according to the present embodiment. In FIG. 7 and FIG. 8, the horizontal axis is a time axis, and the vertical axis is a frequency axis. In FIG. 7 and FIG. 8, a downlink cyclic prefix configuration and an uplink cyclic prefix configuration are each a normal cyclic prefix.

The DwPTS includes the first symbol of the special subframe. The UpPTS includes the last symbol of the special subframe. The GP is present between the DwPTS and the UpPTS. The terminal apparatus 1 may switch from a downlink reception process to an uplink transmission process during the GP. In the UpPTS, the PUSCH, the SRS, and the PRACH are transmitted.

In the uplink subframe, the DMRS associated with the PUSCH is mapped to the SC-FDMA symbols of l=3 in the physical resource block to which the PUSCH is mapped.

In a case that an RRC layer parameter dmrsLess-UpPts is not set to TRUE, in the second slot of the special subframe, the DMRS associated with the PUSCH may be mapped to the SC-FDMA symbols of l=3 in the physical resource block to which the PUSCH is mapped. In the case that an RRC layer parameter dmrsLess-UpPts is not set to TRUE, in the second slot of the special subframe, the DMRS associated with the PUSCH is not transmitted. The RRC layer parameter is also referred to as a higher layer parameter.

The base station apparatus 3 may transmit RRC signaling including the RRC layer parameter dmrsLess-UpPts indicating TRUE to the terminal apparatus 1. The terminal apparatus 1 may set the RRC layer parameter dmrsLess-UpPts to TRUE, based on the RRC signaling including the RRC layer parameter dmrsLess-UpPts indicating TRUE received from the base station apparatus 3.

In the second slot of the special subframe, the PUSCH mapping is started from the SC-FDMA symbol of l=1. In the case that the RRC layer parameter dmrsLess-UpPts is set to TRUE, the PUSCH mapping ends at the SC-FDMA symbol of l=symPUSCH_UpPTS. In a case that the RRC layer parameter dmrsLess-UpPts is not set to TRUE, the PUSCH mapping ends at the SC-FDMA symbol of l=symPUSCH_UpPTS+1. The PUSCH is not mapped to the SC-FDMA symbols to which the DMRS is mapped. For example, in a case that the RRC layer parameter dmrsLess-UpPts is not set to TRUE and symPUSCH_UpPTS is 3, the PUSCH is mapped to the SC-FDMA symbols of l={1, 2, 4} in the second slot of the special subframe.

symPUSCH_UpPTS is an RRC layer parameter. The base station apparatus 3 may transmit RRC signaling including the RRC layer parameter symPUSCH_UpPTS to the terminal apparatus 1. The terminal apparatus 1 may set the RRC layer parameter symPUSCH_UpPTS based on the RRC signaling including the RRC layer parameter symPUSCH_UpPTS.

Hereinafter, a transmission timing of the PUSCH will be described.

The terminal apparatus 1 adjusts, based on detection of a PDCCH including a DCI format (uplink grant) in a subframe n, PUSCH transmission corresponding to the PDCCH to a subframe n+k. A value of k is given in accordance with at least the UL/DL configuration.

Figure 9:
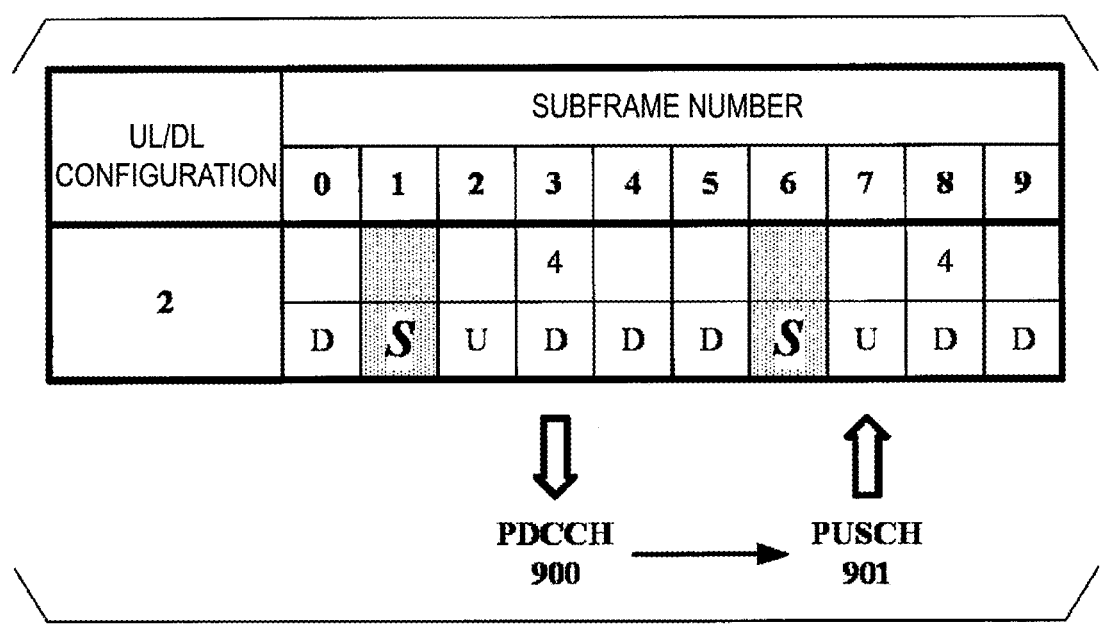
FIG. 9 is a diagram illustrating an example of a value of k according to the present embodiment.
Figure 10:
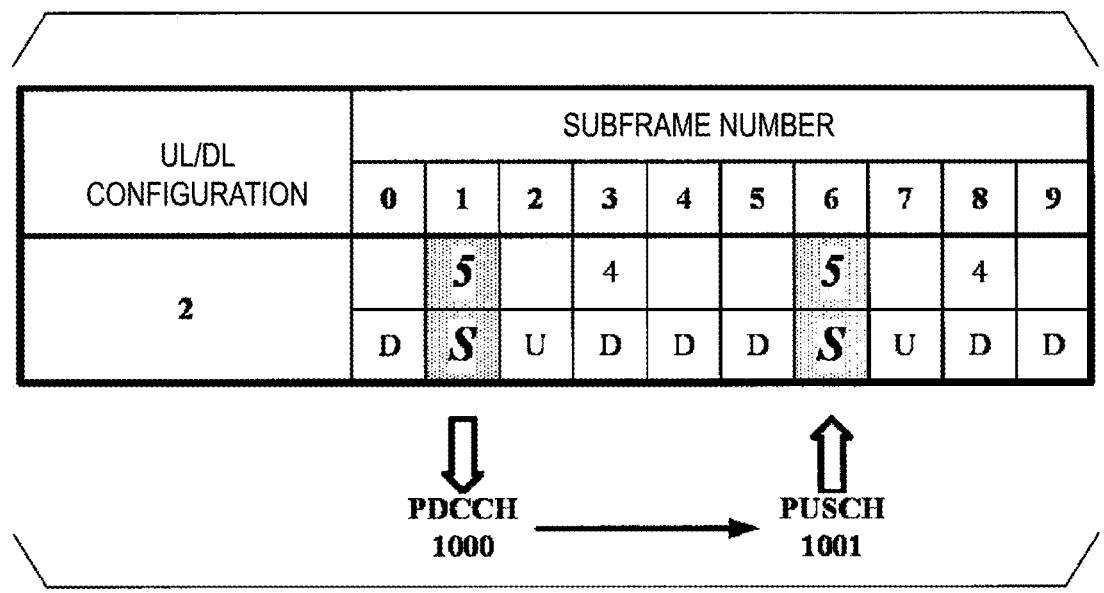
FIG. 10 is a diagram illustrating an example of a value of k according to the present embodiment.

Each of FIG. 9 and FIG. 10 is a diagram illustrating an example of the value of k according to the present embodiment. In a case that the RRC layer parameter symPUSCH_UpPTS is not configured, the terminal apparatus 1 does not adjust the corresponding PUSCH transmission to the special subframe. In the case that the RRC layer parameter symPUSCH_UpPTS is not configured, the value of k may be given based on at least FIG. 9. In FIG. 9, the terminal apparatus 1 adjusts, based on detection of a PDCCH including a DCI format (uplink grant) in a downlink subframe of a subframe number 3 in a radio frame N, PUSCH transmission corresponding to the PDCCH including the DCI format (uplink grant) to an uplink subframe of a subframe number 7 in the radio frame N. In FIG. 9, the terminal apparatus 1 adjusts, based on detection of a PDCCH including a DCI format (uplink grant) in a downlink subframe of a subframe number 8 in the radio frame N, PUSCH transmission corresponding to the PDCCH including the DCI format (uplink grant) to an uplink subframe of a subframe number 2 in a radio frame N+1.

In a case that the RRC layer parameter symPUSCH_UpPTS is configured, the terminal apparatus 1 may adjust the corresponding PUSCH transmission to the special subframe. In the case that the RRC layer parameter symPUSCH_UpPTS is configured, the value of k may be given based on at least FIG. 10. In FIG. 10, the terminal apparatus 1 adjusts, based on detection of a PDCCH including a DCI format (uplink grant) in a special subframe of a subframe number 1 in the radio frame N, PUSCH transmission corresponding to the PDCCH including the DCI format (uplink grant) to a special subframe of a subframe number 6 in the radio frame N. In FIG. 10, the terminal apparatus 1 adjusts, based on detection of a PDCCH including a DCI format (uplink grant) in a downlink subframe of a subframe number 3 in the radio frame N, PUSCH transmission corresponding to the PDCCH including the DCI format (uplink grant) to an uplink subframe of a subframe number 7 in the radio frame N. In FIG. 10, the terminal apparatus 1 adjusts, based on detection of a PDCCH including a DCI format (uplink grant) in a special subframe of a subframe number 6 in the radio frame N, PUSCH transmission corresponding to the PDCCH including the DCI format (uplink grant) to a special subframe of a subframe number 1 in the radio frame N+1. In FIG. 10, the terminal apparatus 1 adjusts, based on detection of a PDCCH including a DCI format (uplink grant) in a downlink subframe of a subframe number 8 in the radio frame N, PUSCH transmission corresponding to the PDCCH including the DCI format (uplink grant) to an uplink subframe of a subframe number 2 in the radio frame N+1.

Hereinafter, transmit power setting for the PUSCH transmission will be described.

In a case that the terminal apparatus 1 performs transmission on the PUSCH without simultaneous transmission on the PUCCH, the terminal apparatus 1 may set a transmit power value for the transmission on the PUSCH in a certain subframe i for a certain cell c based on Equation (3).

$$P_{PUSCH,c}(i) = \min\{P_{CMAX,c}(i), 10\log_{10}(M_{PUSCH,c}(i)) + P_{O\_PUSCH,c}(j) + \alpha_c(j) \cdot PL_c + \Delta_{TF,c}(i) + f_c(i)\}[\text{dBm}] \quad \text{[Equation 3]}$$

Here, $P_{PUSCH,c}(i)$ represents the transmit power value for the transmission on the PUSCH in the subframe i. min {X, Y} is a function for selecting a minimum value of X and Y. $P_{CMAX,c}$ represents a maximum transmit power value (also referred to as maximum output power value), and is configured by the terminal apparatus 1.

$M_{PUSCH,c}$ represents a PUSCH resource (e.g., bandwidth) assigned by the base station apparatus 3, and is expressed by the number of resource blocks. $P_{O\_PUSCH,c}(j)$ represents a parameter indicating a basic transmit power for the transmission on the PUSCH. For example, $P_{O\_PUSCH,c}(j)$ includes a sum of a cell-specific parameter $P_{O\_NOMINAL\_PUSCH,c}(j)$ indicated by the higher layer and a user equipment-specific parameter $P_{O\_UE\_PUSCH,c}(j)$ indicated by the higher layer. $PL_c$ represents an estimation of downlink path loss for a certain cell c, and is calculated in the terminal apparatus 1. $\alpha_c$ represents a coefficient multiplied by a path loss for a certain cell c and is indicated by the higher layer. $\Delta_{TF,c}(i)$ represents an offset value due to modulation scheme/coding rate/resource utilization efficiency, and the like. The terminal apparatus 1 calculates $\Delta_{TF,c}(i)$ based on the number of bits of uplink data (UL-SCH) transmitted on the PUSCH or the number of bits of CQI/PMI, and the number of resource elements for a PUSCH new transmission.

The state of power control adjustment for the current PUSCH transmission (PUSCH power control adjustment state) is given by $f_c(i)$. Here, whether accumulation for $f_c(i)$ is enabled or disabled is given by a higher layer (RRC layer) based on a parameter Accumulation-enabled.

In a case that the accumulation is enabled based on the RRC layer parameter Accumulation-enabled provided from the higher layer, the terminal apparatus 1 sets the value of $f_c(i)$, based on Equation (4).

$$f_c(i)=f_c(i-1)+\delta_{PUSCH,c}(i-K_{PUSCH})  \quad \text{[Equation 4]}$$

In a case that the accumulation is disabled (in other words, the accumulation is not enabled) based on the RRC layer parameter Accumulation-enabled provided from the higher layer, the terminal apparatus 1 sets the value of $f_c(i)$, based on Equation (5).

$$f_c(i)=\delta_{PUSCH,c}(i-K_{PUSCH})  \quad \text{[Equation 5]}$$

Here, $\delta_{PUSCH,c}$ is a correction value and is referred to as a TPC command. In other words, in the case that the accumulation is enabled based on the parameter Accumulation-enabled provided from the higher layer, $\delta_{PUSCH,c}(i-K_{PUSCH})$ indicates a value accumulated in $f_c(i-1)$.

$\delta_{PUSCH,c}(i-K_{PUSCH})$ is indicated based on a value to which a 'TPC command for the PUSCH' field is set, the 'TPC command for the PUSCH' field being included in the DCI format (uplink grant) for a cell received in a certain subframe $(i-K_{PUSCH})$.

For example, in the case that the accumulation is enabled based on the RRC layer parameter Accumulation-enabled provided from the higher layer, a value {00, 01, 10, 11} to which the field of the TPC command for the PUSCH (2-bit information field) included in the DCI format (uplink grant) is set, is mapped to a correction value {−1, 0, 1, 3}.

For example, in the case that the accumulation is disabled based on the RRC layer parameter Accumulation-enabled provided from the higher layer, the value {00, 01, 10, 11} to which the field of the TPC command for the PUSCH (2-bit information field) included in the DCI format (uplink grant) is set, is mapped to a correction value {−4, −1, 1, 4}.

Figure 11:
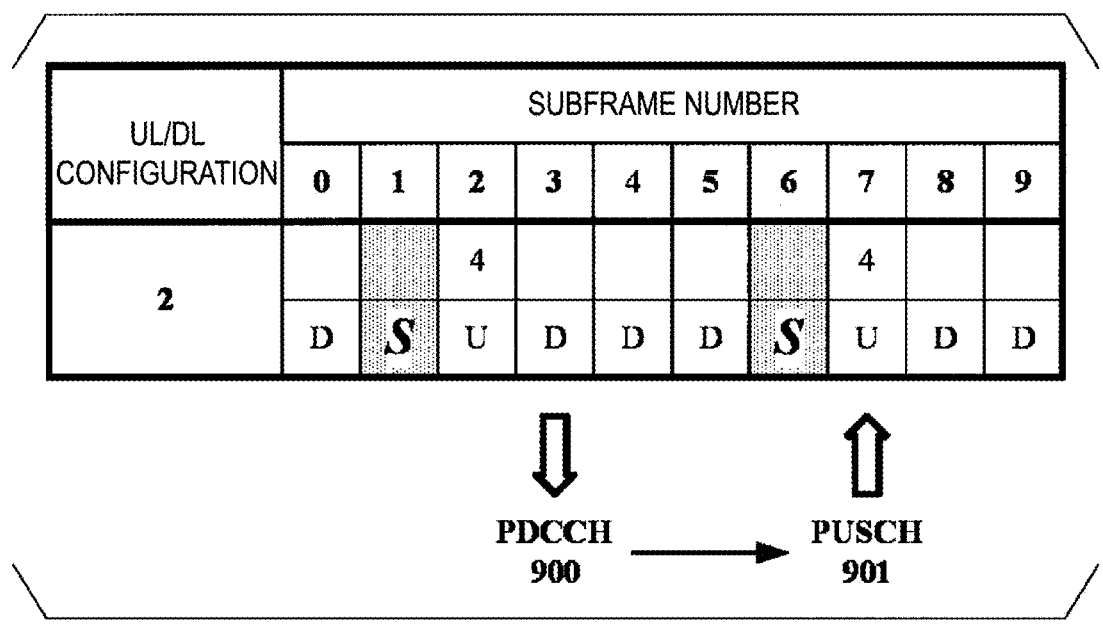
FIG. 11 is a diagram illustrating an example of a value of $K_{PUSCH}$ according to the present embodiment.
Figure 12:
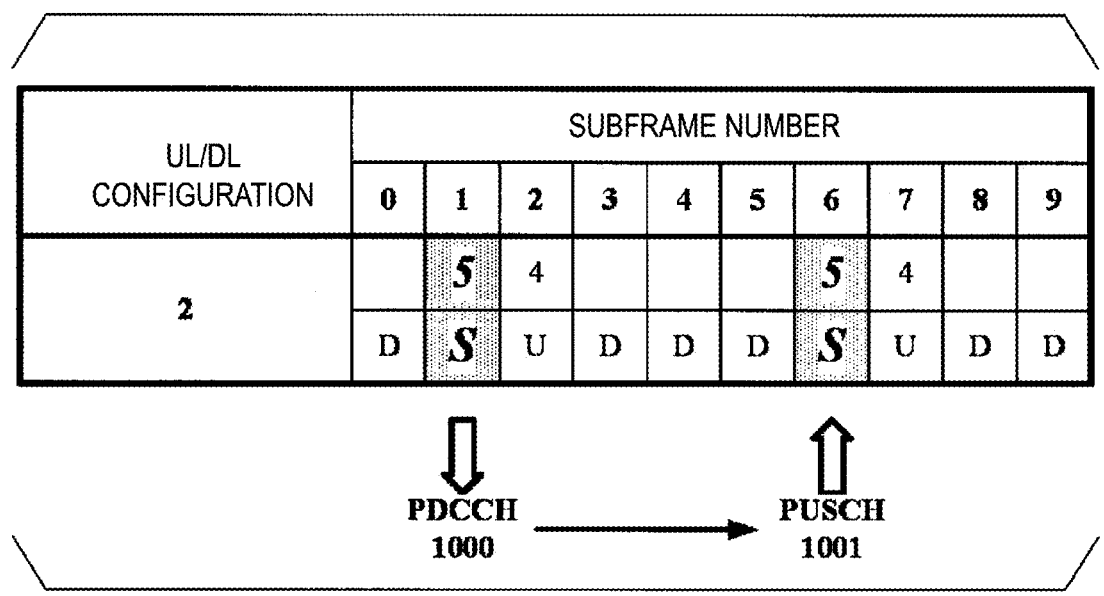
FIG. 12 is a diagram illustrating an example of a value of $K_{PUSCH}$ according to the present embodiment.

FIG. 11 and FIG. 12 are diagrams illustrating an example of the value of $K_{PUSCH}$ according to the present embodiment. In a case that the UL/DL configuration is 2 and the RRC layer parameter symPUSCH_UpPTS is not configured for the terminal apparatus 1, the value of $K_{PUSCH}$ may be given based on at least FIG. 11. For example, in a case that the UL/DL configuration 2 and the subframe i is subframe 2 or 7, the value of $K_{PUSCH}$ is 4.

In a case that the UL/DL configuration is 2 and the RRC layer parameter symPUSCH_UpPTS is configured for the terminal apparatus 1, the value of $K_{PUSCH}$ may be given based on at least FIG. 12. For example, in a case that the UL/DL configuration 2 and the subframe i is subframe 1 or 6, the value of $K_{PUSCH}$ is 5. For example, in a case that the UL/DL configuration 2 and the subframe i is subframe 2 or 7, the value of $K_{PUSCH}$ is 4.

In the case that the accumulation is enabled based on the RRC layer parameter Accumulation-enabled provided from the higher layer, the terminal apparatus 1 may determine whether the value of $\delta_{PUSCH,c}$ is 0 based at least on whether the RRC layer parameter symPUSCH_UpPTS is configured for the terminal apparatus 1. Specifically, in the case that the accumulation is enabled based on the RRC layer parameter Accumulation-enabled provided from the higher layer, the terminal apparatus 1 may set the value of $f_c(i)$ based at least on whether the RRC layer parameter symPUSCH_UpPTS is configured for the terminal apparatus 1.

In the case that the accumulation is enabled based on the RRC layer parameter Accumulation-enabled provided from the higher layer, and the RRC layer parameter symPUSCH_UpPTS is not configured for the terminal apparatus 1, and the subframe i is not an uplink subframe, the terminal apparatus 1 may set $\delta_{PUSCH,c}$ to 0. The case that the subframe i is not an uplink subframe means that the subframe i is a downlink subframe or a special subframe.

In the case that the accumulation is enabled based on the RRC layer parameter Accumulation-enabled provided from the higher layer, and the RRC layer parameter symPUSCH_UpPTS is configured for the terminal apparatus 1, and the subframe i is a downlink subframe, the terminal apparatus 1 may set $\delta_{PUSCH,c}$ to 0.

In the case that the accumulation is disabled based on the RRC layer parameter Accumulation-enabled provided from the higher layer, the terminal apparatus 1 may set the value of $f_c(i)$ based at least on whether the RRC layer parameter symPUSCH_UpPTS is configured for the terminal apparatus 1.

In the case that the accumulation is disabled based on the RRC layer parameter Accumulation-enabled provided from the higher layer, and the RRC layer parameter symPUSCH_UpPTS is not configured for the terminal apparatus 1, and the subframe i is not an uplink subframe, the terminal apparatus 1 may set $f_c(i)$, based on Equation (6) described below.

In the case that the accumulation is disabled based on the RRC layer parameter Accumulation-enabled provided from the higher layer, and the RRC layer parameter symPUSCH_UpPTS is not configured for the terminal apparatus 1, and the subframe i is an uplink subframe, and in a case that a PDCCH including a DCI format (uplink grant) for a subframe i is decoded, the terminal apparatus 1 may set $f_c(i)$ based on Equation (5) described above.

In the case that the accumulation is disabled based on the RRC layer parameter Accumulation-enabled provided from the higher layer, and the RRC layer parameter symPUSCH_UpPTS is configured for the terminal apparatus 1, and the subframe i is a downlink subframe, the terminal apparatus 1 may set $f_c(i)$ based on Equation (6) described below.

In the case that the accumulation is disabled based on the RRC layer parameter Accumulation-enabled provided from the higher layer, and the RRC layer parameter symPUSCH_UpPTS is configured for the terminal apparatus 1, and the subframe i is not a downlink subframe, and a PDCCH including a DCI format (uplink grant) for a subframe i is decoded, the terminal apparatus 1 may set $f_c(i)$ based on Equation (5) described above. The case that the subframe i is not a downlink subframe means that the subframe i is an uplink subframe or a special subframe.

$$f_c(i)=f_c(i-1) \quad \text{[Equation 6]}$$

Configurations of apparatuses according to the present embodiment will be described below.

Figure 13:
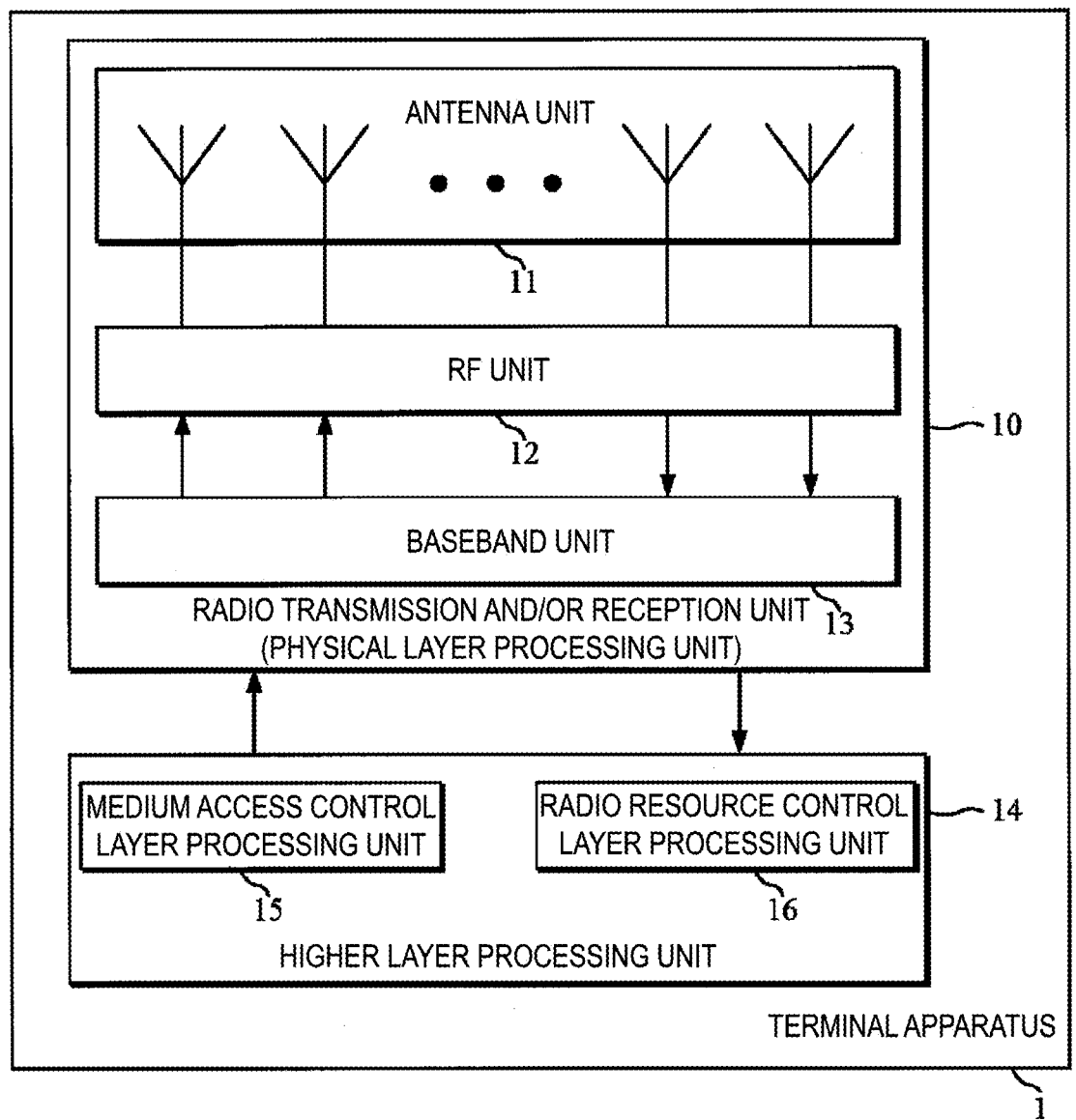
FIG. 13 is a schematic block diagram illustrating a configuration of a terminal apparatus 1 according to the present embodiment.

FIG. 13 is a schematic block diagram illustrating a configuration of the terminal apparatus 1 according to the present embodiment. As illustrated, the terminal apparatus 1 is configured to include a radio transmission and/or reception unit 10 and a higher layer processing unit 14. The radio transmission and/or reception unit 10 is configured to include an antenna unit 11, a Radio Frequency (RF) unit 12, and a baseband unit 13. The higher layer processing unit 14 is configured to include a medium access control layer processing unit 15 and a radio resource control layer processing unit 16. The radio transmission and/or reception unit 10 is also referred to as a transmitter, a receiver or a physical layer processing unit.

The higher layer processing unit 14 outputs uplink data (transport block) generated by a user operation or the like, to the radio transmission and/or reception unit 10. The higher layer processing unit 14 performs processing of a Medium Access Control (MAC) layer, a Packet Data Convergence Protocol (PDCP) layer, a Radio Link Control (RLC) layer, and a Radio Resource Control (RRC) layer.

The medium access control layer processing unit 15 included in the higher layer processing unit 14 performs processing of the Medium Access Control layer. The medium access control layer processing unit 15 controls transmission of a scheduling request, based on various types of configuration information/parameters managed by the radio resource control layer processing unit 16.

The radio resource control layer processing unit 16 included in the higher layer processing unit 14 performs processing of the Radio Resource Control layer. The radio resource control layer processing unit 16 manages various types of configuration information/parameters of the terminal apparatus 1. The radio resource control layer processing unit 16 sets various types of configuration information/parameters based on a higher layer signal received from the base station apparatus 3. Namely, the radio resource control layer processing unit 16 sets the various configuration information/parameters in accordance with the information for indicating the various configuration information/parameters received from the base station apparatus 3.

The radio transmission and/or reception unit 10 performs processing of the physical layer, such as modulation, demodulation, coding, decoding, and the like. The radio transmission and/or reception unit 10 demultiplexes, demodulates, and decodes a signal received from the base station apparatus 3, and outputs the information resulting from the decoding to the higher layer processing unit 14. The radio transmission and/or reception unit 10 generates a transmit signal by modulating and coding data, and performs transmission to the base station apparatus 3.

The RF unit 12 converts (down-converts) a signal received via the antenna unit 11 into a baseband signal by orthogonal demodulation and removes unnecessary frequency components. The RF unit 12 outputs a processed analog signal to the baseband unit.

The baseband unit 13 converts the analog signal input from the RF unit 12 into a digital signal. The baseband unit 13 removes a portion corresponding to a Cyclic Prefix (CP) from the digital signal resulting from the conversion, performs Fast Fourier Transform (FFT) of the signal from which the CP has been removed, and extracts a signal in the frequency domain.

The baseband unit 13 generates an SC-FDMA symbol by performing Inverse Fast Fourier Transform (IFFT) of the data, adds CP to the generated SC-FDMA symbol, generates a baseband digital signal, and converts the baseband digital signal into an analog signal. The baseband unit 13 outputs the analog signal resulting from the conversion, to the RF unit 12.

The RF unit 12 removes unnecessary frequency components from the analog signal input from the baseband unit 13 using a low-pass filter, up-converts the analog signal into a signal of a carrier frequency, and transmits the up-converted signal via the antenna unit 11. Furthermore, the RF unit 12 amplifies power. Furthermore, the RF unit 12 may have a function of controlling transmit power. The RF unit 12 is also referred to as a transmit power control unit.

Figure 14:
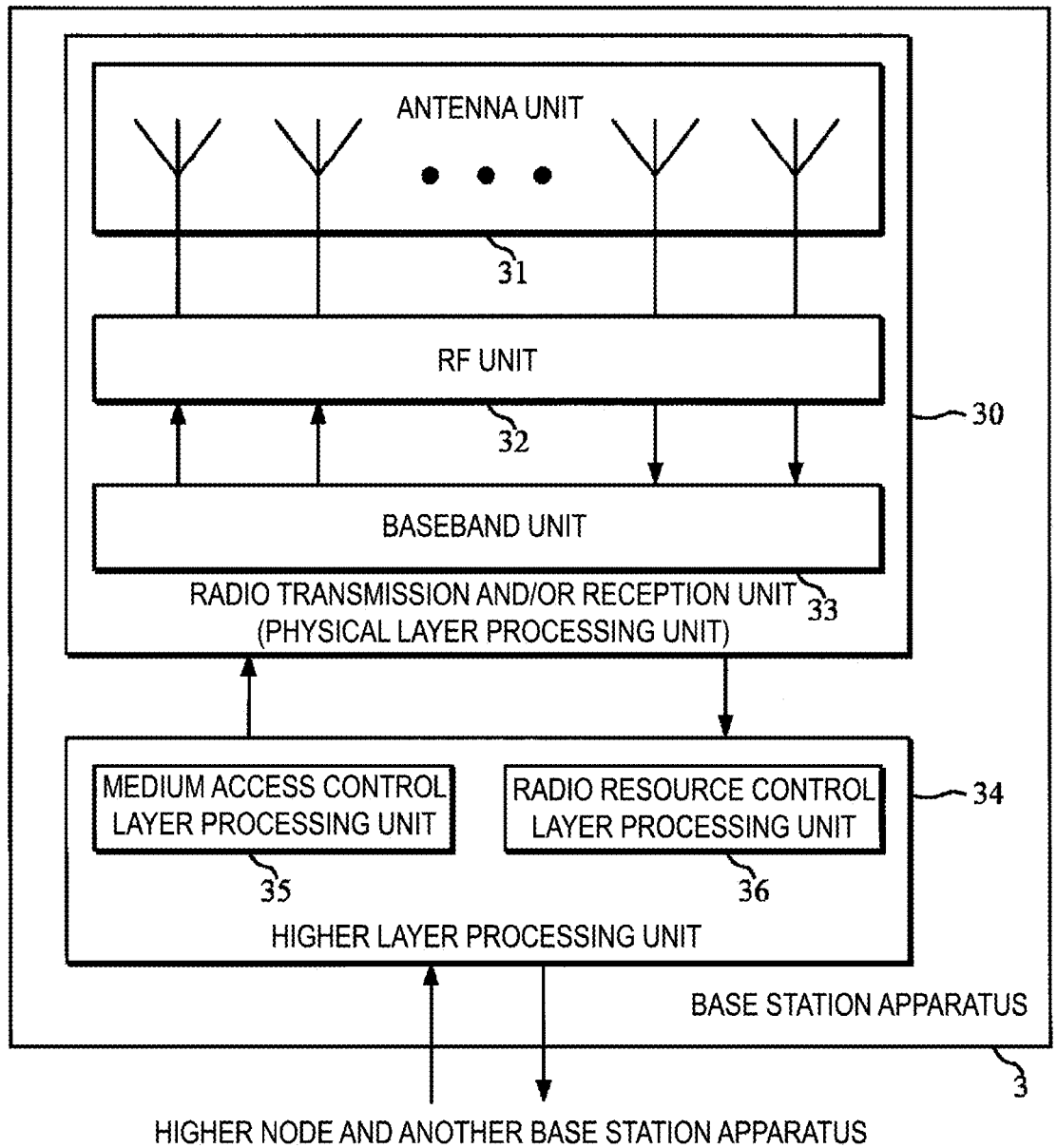
FIG. 14 is a schematic block diagram illustrating a configuration of a base station apparatus 3 according to the present embodiment.

FIG. 14 is a schematic block diagram illustrating a configuration of the base station apparatus 3 according to the present embodiment. As illustrated, the base station apparatus 3 is configured to include a radio transmission and/or reception unit 30 and a higher layer processing unit 34. The radio transmission and/or reception unit 30 is configured to include an antenna unit 31, an RF unit 32, and a baseband unit 33. The higher layer processing unit 34 is configured to include a medium access control layer processing unit 35 and a radio resource control layer processing unit 36. The radio transmission and/or reception unit 30 is also referred to as a transmitter, a receiver or a physical layer processing unit.

The higher layer processing unit 34 performs processing of the Medium Access Control (MAC) layer, the Packet Data Convergence Protocol (PDCP) layer, the Radio Link Control (RLC) layer, and the Radio Resource Control (RRC) layer.

The medium access control layer processing unit 35 included in the higher layer processing unit 34 performs processing of the Medium Access Control layer. The medium access control layer processing unit 35 performs processing associated with a scheduling request, based on various types of configuration information/parameters managed by the radio resource control layer processing unit 36.

The radio resource control layer processing unit 36 included in the higher layer processing unit 34 performs processing of the Radio Resource Control layer. The radio resource control layer processing unit 36 generates, or acquires from a higher node, downlink data (transport block) allocated on a physical downlink shared channel, system information, an RRC message, a MAC Control Element (CE), and the like, and performs output to the radio transmission and/or reception unit 30. Furthermore, the radio resource control layer processing unit 36 manages various types of configuration information/parameters for each of the terminal apparatuses 1. The radio resource control layer processing unit 36 may set various types of configuration information/parameters for each of the terminal apparatuses 1 via higher layer signaling. That is, the radio resource control layer processing unit 36 transmits/broadcasts information for indicating various types of configuration information/parameters.

The functionality of the radio transmission and/or reception unit 30 is similar to the functionality of the radio transmission and/or reception unit 10, and hence description thereof is omitted.

Each of the units having the reference signs 10 to 16 included in the terminal apparatus 1 may be configured as a circuit. Each of the units having the reference signs 30 to 36 included in the base station apparatus 3 may be configured as a circuit.

Hereinafter, various aspects of the terminal apparatus 1 and the base station apparatus 3 according to the present embodiment will be described.

(1) An aspect of the present invention is a terminal apparatus including a transmitter configured to map a PUSCH to a SC-FDMA symbol of a special subframe, based on an RRC layer parameter symPUSCH_UpPTS to transmit the PUSCH; and a transmit power control unit configured to determine the parameter $f_c(i)$, based on at least whether the RRC layer parameter symPUSCH_UpPTS is configured for the terminal apparatus, and calculate transmit power for PUSCH transmission in a subframe i, based on at least the parameter $f_c(i)$.

(2) An aspect of the present invention is the terminal apparatus of above (1), wherein the parameter $f_c(i)$ is given based on at least $\delta_{PUSCH,c}$, in a case that the RRC layer parameter symPUSCH_UpPTS is not configured for the terminal apparatus, and the subframe i is not an uplink subframe, $\delta_{PUSCH,c}$ is set to 0, and in a case that the RRC layer parameter symPUSCH_UpPTS is configured for the terminal apparatus, and the subframe i is a downlink subframe, $\delta_{PUSCH,c}$ is set to 0.

Accordingly, the terminal apparatus and the base station apparatus can efficiently communicate with each other by use of uplink signals.

A program running on the base station apparatus 3 and the terminal apparatus 1 according to an aspect of the present invention may be a program that controls a Central Processing Unit (CPU) and the like, such that the program causes a computer to operate in such a manner as to realize the functions of the above-described embodiment according to an aspect of the present invention. The information handled in these devices is temporarily stored in a Random Access Memory (RAM) while being processed. Thereafter, the information is stored in various types of Read Only Memory (ROM) such as a Flash ROM and a Hard Disk Drive (HDD), and when necessary, is read by the CPU to be modified or rewritten.

Note that the terminal apparatus 1 and the base station apparatus 3 according to the above-described embodiment may be partially achieved by a computer. In that case, this configuration may be realized by recording a program for realizing such control functions on a computer-readable recording medium and causing a computer system to read the program recorded on the recording medium for execution.

Note that it is assumed that the "computer system" mentioned here refers to a computer system built into the terminal apparatus 1 or the base station apparatus 3, and the computer system includes an OS and hardware components such as a peripheral apparatus. Furthermore, the "computer-readable recording medium" refers to a portable medium such as a flexible disk, a magneto-optical disk, a ROM, a CD-ROM, and the like, and a storage apparatus such as a hard disk built into the computer system.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Furthermore, the base station apparatus 3 according to the above-described embodiment may be achieved as an aggregation (apparatus group) including multiple apparatuses. Each of the apparatuses constituting such an apparatus group may include some or all portions of each function or each functional block of the base station apparatus 3 according to the above-described embodiment. The apparatus group is required to have each general function or each functional block of the base station apparatus 3. Furthermore, the terminal apparatus 1 according to the above-described embodiment can also communicate with the base station apparatus as the aggregation.

Furthermore, the base station apparatus 3 according to the above-described embodiment may serve as an Evolved Universal Terrestrial Radio Access Network (EUTRAN). Furthermore, the base station apparatus 3 according to the above-described embodiment may have some or all portions of the functions of a node higher than an eNodeB.

Furthermore, some or all portions of each of the terminal apparatus 1 and the base station apparatus 3 according to the above-described embodiment may be typically achieved as an LSI which is an integrated circuit or may be achieved as a chip set. The functional blocks of each of the terminal apparatus 1 and the base station apparatus 3 may be individually achieved as a chip, or some or all of the functional blocks may be integrated into a chip. Furthermore, a circuit integration technique is not limited to the LSI, and may be realized with a dedicated circuit or a general-purpose processor. Furthermore, in a case where with advances in semiconductor technology, a circuit integration technology with which an LSI is replaced appears, it is also possible to use an integrated circuit based on the technology.

Furthermore, according to the above-described embodiment, the terminal apparatus is described as one example of a communication apparatus, but the present invention is not limited to this, and can be applied to a fixed-type or a stationary-type electronic apparatus installed indoors or outdoors, for example, a terminal apparatus or a communication apparatus, such as an audio-video (AV) apparatus, a kitchen apparatus, a cleaning or washing machine, an air-conditioning apparatus, office equipment, a vending machine, an automobile, a bicycle, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of one aspect of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

An aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST 1 (1A, 1B, 1C) Terminal apparatus
3 Base station apparatus
10 Radio transmission and/or reception unit
11 Antenna unit
12 RF unit
13 Baseband unit
14 Higher layer processing unit
15 Medium access control layer processing unit
16 Radio resource control layer processing unit
30 Radio transmission and/or reception unit 31 Antenna unit
32 RF unit
33 Baseband unit
34 Higher layer processing unit
35 Medium access control layer processing unit
36 Radio resource control layer processing unit

The invention claimed is:

1. A terminal apparatus comprising:
one or more non-transitory computer-readable media storing computer-executable instructions embodied therein; and
at least one processor coupled to the one or more non-transitory computer-readable media, and configured to execute the computer-executable instructions to:
receive downlink control information (DCI) indicating a physical uplink shared channel (PUSCH) resource at a first subframe; and
perform a PUSCH transmission at a second subframe that is different from the first subframe, wherein a value that indicates a time difference between the first subframe and the second subframe is determined based on (i) a first table if a symPUSCH_UpPTS which is a radio resource control (RRC) layer parameter is configured, and (ii) a second different table if the symPUSCH_UpPTS is not configured, wherein:
each of the first and second tables includes a one-to-one mapping between the value and a subframe on which the DCI is received, and
the second subframe is either (i) one of a special subframe and an uplink (UL) subframe if the value is derived from the first table, or (ii) a UL subframe if the value is derived from the second table.

2. The terminal apparatus according to claim 1, wherein the at least one processor is further configured to execute the computer-executable instructions to:
determine a transmission power for the PUSCH transmission based at least on a correction value that is determined based on a value of a $K_{PUSCH}$ parameter, wherein:
the $K_{PUSCH}$ parameter indicates a time difference between the PUSCH transmission and a DCI that indicates a transmit power control command for determining the transmission power of the PUSCH transmission,
the value of the $K_{PUSCH}$ parameter is derived from a third table if the symPUSCH_UpPTS is configured,
the value of the $K_{PUSCH}$ parameter is derived from a fourth different table if the symPUSCH_UpPTS is not configured, and
both of the third and fourth tables include a one-to-one mapping between the value of the $K_{PUSCH}$ parameter and the second subframe on which the PUSCH transmission is performed.

3. A communication method for a terminal apparatus, the communication method comprising:
receiving downlink control information (DCI) indicating a physical uplink shared channel (PUSCH) resource at a first subframe; and
performing a PUSCH transmission at a second subframe that is different from the first subframe, wherein a value that indicates a time difference between the first subframe and the second subframe is determined based on (i) a first table if a symPUSCH_UpPTS which is a radio resource control (RRC) layer parameter is configured, and (ii) a second different table if the symPUSCH_UpPTS is not configured, wherein:
each of the first and second tables includes a one-to-one mapping between the value and a subframe on which the DCI is received, and
the second subframe is either (i) one of a special subframe and an uplink (UL) subframe if the value is derived from the first table, or (ii) a UL subframe if the value is derived from the second table.

4. The communication method according to claim 3, further comprising:
determining a transmission power for the PUSCH transmission based at least on a correction value that is determined based on a value of a $K_{PUSCH}$ parameter, wherein:
the $K_{PUSCH}$ parameter indicates a time difference between the PUSCH transmission and a DCI that indicates a transmit power control command for determining the transmission power of the PUSCH transmission,
the value of the $K_{PUSCH}$ parameter is derived from a third table if the symPUSCH_UpPTS is configured,
the value of the $K_{PUSCH}$ parameter is derived from a fourth different table if the symPUSCH_UpPTS is not configured, and
both of the third and fourth tables include a one-to-one mapping between the value of the $K_{PUSCH}$ parameter and the second subframe on which the PUSCH transmission is performed.

* * * * *